Figure 1:
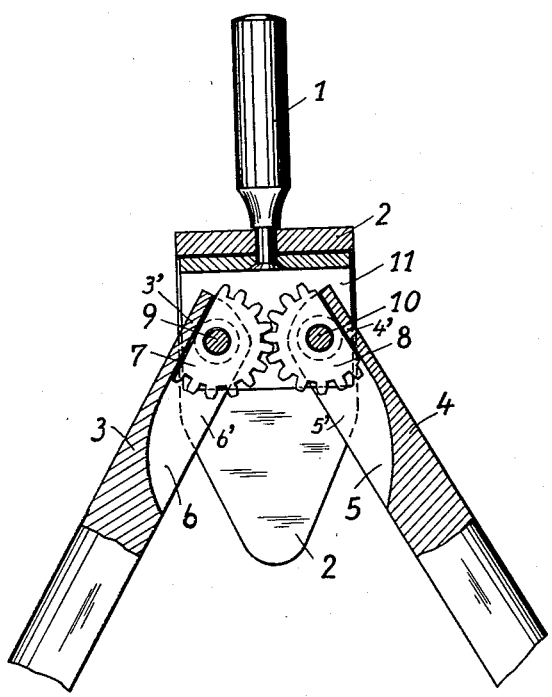

June 4, 1957   R. ESCHENBACH   2,794,259

COMPASS

Filed April 22, 1954

INVENTOR
R. Eschenbach
ATTYS.

UNITED STATES PATENT OFFICE 2,794,259

COMPASS

Rudolf Eschenbach, Nurnberg, Germany, assignor to C. Proebster, Jr. Nachfolger, Nurnberg, Germany, a German firm Application April 22, 1954, Serial No. 424,938

Claims priority, application Germany April 24, 1953

3 Claims. (Cl. 33—153)

The present invention relates to improvements in compasses, and it is the object of the invention to design a pivot guide for compasses which is very resistant to wear and easily exchangeable.

In compasses previously known, guides of various types and shapes have been used. Compasses have also been designed in which the upper ends of the legs were provided with gears or gear sectors integral with and worked out of the material of the legs at the inner sides thereof and directly or indirectly engaging each other. Since such gears or sectors can only be made of very small radius because of the small space available on the compass legs, the pressure exerted upon them, especially if the compass is not properly used, is very great. Consequently, since the gear wheels or gear sectors are integral with the legs and thus not replaceable separately from the entire leg, the entire compass is quickly worn out and completely useless. Since the legs of a compass are usually made of brass or other relatively soft metal, gears which are made in one piece with the legs must consist of the same material, which renders them no stronger than the legs, which results in weak gears which are worn out after a short time.

It is one of the objects of the present invention to design a compass with geared legs which overcomes the disadvantages of previous designs.

More specifically, it is an object of the invention to design a compass with geared legs which is more easily and cheaply manufactured than compasses of a similar type previously made, which can be sold at a much lower price, and the useful life of which greatly exceeds that of similar compasses as previously known.

Another object of the invention is to design a compass of the geared type in which, while the compass legs themselves be made of a soft, base metal, the gears or gear sectors may consist of a higher grade of metal, more resistant to wear, with the additional advantage that the gears or gear sectors may then be made of a very small size, thus permitting even very small compasses or calipers to be provided with geared legs.

The essential feature of the invention resides in providing a compass with geared legs, the upper ends of which have separate gears or gear sectors non-rotatably secured to such legs and in mesh with each other.

Additional and more specific features of the invention consist in providing a slot in the upper end of each compass leg within which a gear sector is non-rotatably mounted by the simple expedient of having the flat cut-off side of the sector abut against the remaining rear wall of the slot and being held in such position by a screw which at the same time forms the pivot of such leg and which is mounted in a guide or bearing element of inverted U-shape provided at its upper end with the customary compass handle.

Still another feature of the invention resides in the use of such screws for the triple purpose of serving as a means for mounting the gear sectors in a properly spaced relation to each other, as a pivot for the compass legs, and, last but not least, as a means for adjusting the movability of the legs relative to each other.

Figure 2:
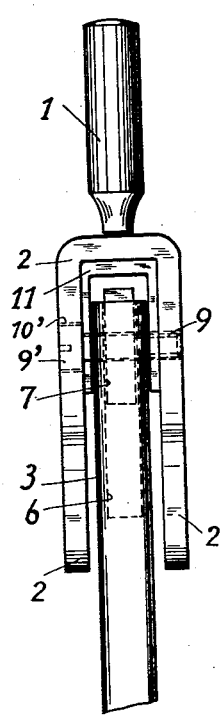

Further objects, features, and advantages of the present invention will appear from the following detailed description thereof and the accompanying drawings, in which Fig. 1 shows a vertical section through the pivot guide and the upper portion of the compass legs according to the invention, while Fig. 2 is a side view thereof.

Referring to the drawings, the new compass comprises a handle 1 of conventional shape which is rigidly secured to the frame element 2 consisting of an inverted U-shaped member which serves as a frame element and pivot for the two legs 3 and 4 and the gear sectors 7 and 8 thereon. For mounting the two gear sectors 7 and 8 on, or more properly speaking, within the legs 3 and 4, the latter have slots 5 and 6 cut into their upper ends at their opposed inner sides, preferably made by milling, and of a width approximately corresponding to twice the thickness or more of the remaining wall portion 5', 6', and of a depth sufficient to accommodate the gear sectors 7 and 8 therein and to leave an outer or bottom wall portion 3', 4'. The gear sectors 7 and 8 are simply made by having approximately one-third of the diameter of an ordinary gear wheel with approximately 16 to 20 teeth cut off so as to leave a sector with approximately 9 to 12 teeth thereon. Obviously the size and thickness of the gear sector and the number of teeth thereon will depend upon the particular size of the compass and the purpose for which it is used. The size of the cut-off portion of the gears and the thickness of the remaining outer wall portion 3', 4', is also made so as to permit the gear sectors 7, 8 to be journaled substantially in the center of the width of each leg. By thus cutting off a smaller part of the gear, the same retains its original gear bore. The gears 7 and 8 are stationarily mounted on the legs 3 and 4, being inserted into the slots 5 and 6 so as to rest with their flat, cut-off sides against the remaining outer wall portions 3', 4', and by being loosely journaled on screws 9 and 10. The heads 9' of these screws are preferably sunk completely into corresponding bores 10' so as to be rotatable therein, and to be flush with the outer surface of one arm of the U-shaped element 2. An insert 11 of inverted U-shape is preferably fitted intermediate the legs 3 and 4 and encloses both gear sectors 7 and 8. It serves the multiple purpose of enclosing, protecting, and laterally guiding the sectors, and of acting as a brake for regulating the movability of the legs 3 and 4. For this purpose, the head 9' of each screw 9 and 10 abuts against the outer surface of one arm of such U-shaped insert 11, so that when one or the other or both screws 9 and 10 are tightened, the arms of the insert 11 are forced together, and the inner surfaces of these arms are pressed against the respective gear sector 7 or 8.

Such method of mounting the legs 3 and 4 also makes the invention very suitable for use in calipers and similar instruments for architectural or industrial use, where the instrument is required for measuring or gauging purposes. In such event, at least one thumbscrew may be provided in place of the screw 9 as shown, so as to permit tightening of the screw to lock the legs in their adjusted angular position. Since the two legs 3 and 4 are positively connected by the gear sectors 7 and 8, only one such thumbscrew may be required to bind both gear sectors and retain the legs in their adjusted position. However, in a larger sized instrument, or in the event that a strain is to be applied to the legs tending to open or close the legs, both screws 9 and 10 may be made in the form of thumbscrews.

An additional advantage of the new method of mounting the compass legs consists in the fact that, since the legs are not pivotally secured to each other, as it is the case in compasses of customary design, but are mounted in a spaced relation to each other—even though at a short distance from each other—and positively connected to each other as well as to the U-shaped guide 2, the latter will always automatically assume a central position relative to the legs 3 and 4, so that the handle 1 will always be vertical relative to the surface to which the instrument is being applied.

Particularly as compared with geared compasses of prior design in which the gear sectors and compass legs were made of one piece of material and the sectors had to be worked out by special machinery and manual tooling, and at a great expense, the compass according to the present invention has the great advantage that it can be made at a very low cost, since ordinary gears made on automatic machinery may be used of which only a portion need be cut off to be ready for insertion either in a new instrument or, as a replacement of worn gears, in one that has been used for a long time. Such ability to replace the most sensitive part of this type of compass considerably lengthens its usefulness.

In large sized instruments where the gear sectors may be subjected to considerable strain, the invention may also be applied by then spacing the two gear sectors apart from each other and by interconnecting them by the provision of a pair of pinions in mesh with each other and mounted intermediate the legs of the U-shaped guide member. Also, the invention is not limited to the particular form of mounting the sectors in slots provided in the upper ends of the compass legs, nor to the particular shape of the gear sectors as shown, inasmuch as the invention broadly resides in the use of separate gears or gear sectors non-rotatably secured to the upper ends of the legs of a compass or similar instrument and in mesh with each other, either directly or indirectly.

Having thus described my invention in detail, what I claim as new is:

1. A compass comprising a pair of legs, an inverted U-shaped frame element having a handle at its upper end, each of said legs having a longitudinal slot in one side of its upper end, said slots facing each other and each having a bottom wall and a bore passing through the side walls of each slot, a pair of gear sectors within said slots and in mesh with each other, each sector having a bore therein, and a flat cutoff side abutting against said bottom wall when the bore of the side walls and of said gear sectors are in alignment, and a separate headed screw to form the pivot of each of said legs rotatably passing through one of the arms of said U-shaped element, one of said legs and the bore of the gear sector associated with that leg, and being threaded in the other arm of said U-shaped element whereby said headed screw serves the triple purpose of providing a means for mounting the gear sector, a pivot for the compass leg, and a means to adjust the resistance to pivoting of the compass leg.

2. A compass comprising a pair of legs, an inverted U-shaped frame element having a handle at its upper end, a U-shaped insert within said U-shaped frame element each of said legs having a longitudinal slot within its upper end, said slots facing each other and each having a bottom wall and a bore passing through the side walls of each slot, a pair of gear sectors one within each of said slots and in mesh with each other, each sector having a bore therein, and a flat cut-off side abutting against said bottom wall when the bores of said side walls and said gear sectors are in alignment, said U-shaped insert embracing both of said legs and gear sectors, and a pair of headed screws rotatably passing through one of the arms of said U-shaped frame element, said U-shaped insert, said legs and the bore of said gear sectors, and being threaded in the other arm of said first U-shaped element whereby said headed screws serve as pivots for said legs, retaining means for said gear sectors and as means to adjust the frictional resistance of said legs on said pivots.

3. A compass comprising a pair of legs, an inverted U-shaped element having a handle at its upper end and a pair of transverse bores within the arms thereof, each of said legs having a longitudinal slot within its upper end, said slots facing each other and each having a bottom wall and a bore passing transversely through the side walls of each slot, a pair of gear sectors within said slots and in mesh with each other, each sector having a bore therein, said sectors being formed of a pair of gears of equal size and shape with an equal segment cut off from each gear, the flat chord side of said sector abutting against said bottom wall of said slot so as to secure said sector non-rotatably within said slot with the bores of said slots and said sectors in alignment, a second element of inverted U-shape fitted within said first element and having a pair of transverse bores within its arms in line with the bores in said first element and said sectors, said second element embracing both of said legs along their flat outer surfaces, and a pair of headed screws passing through the bores in said first and second elements, said legs and said gear sector, said screws being threaded in the bores of one of the arms of said first element and having their heads completely and rotatably sunk in the bores of the other arm thereof, the lower surface of said screw heads abutting upon the outer surface of one of the arms of said second U-shaped element so that, when said screws are tightened, they press upon said second element, pressing its two arms together and thereby tightly embracing said legs on both flat outer side surfaces thereof.

References Cited in the file of this patent

UNITED STATES PATENTS

| 831,354 | King | Sept. 18, 1906 |
| 1,343,664 | Dieckmann | June 15, 1920 |
| 2,651,112 | Duclos | Sept. 8, 1953 |

FOREIGN PATENTS

| 38,227 | Sweden | Nov. 19, 1917 |
| 234,373 | Switzerland | June 16, 1945 |